April 2, 1940.  R. ERBAN  2,196,064

DRIVING ENERGY CONSUMER

Filed Oct. 21, 1933  5 Sheets-Sheet 1

INVENTOR.
Richard Erban.
BY
ATTORNEY.

April 2, 1940.  R. ERBAN  2,196,064

DRIVING ENERGY CONSUMER

Filed Oct. 21, 1933   5 Sheets-Sheet 3

*INVENTOR.*
Richard Erban.
BY
*ATTORNEY.*

April 2, 1940. R. ERBAN 2,196,064
DRIVING ENERGY CONSUMER
Filed Oct. 21, 1933 5 Sheets-Sheet 4

Fig. 9.

INVENTOR.
Richard Erban.
BY
ATTORNEY.

Patented Apr. 2, 1940

2,196,064

UNITED STATES PATENT OFFICE 2,196,064

DRIVING ENERGY CONSUMER

Richard Erban, Vienna, Austria, assignor to Erban Patents Corporation, a corporation of New York Application October 21, 1933, Serial No. 694,634
In Austria February 4, 1933

17 Claims. (Cl. 74—572)

This invention relates to means for the transmission of energy between power plants and machines or other energy consuming devices, and has particular reference to improvements in energy transmission means embodying elements such as fly-wheels.

As is well known, fly-wheels have been employed heretofore primarily to equalize or balance periodically recurring transient differences, usually in the nature of cyclic fluctuations occurring within definite and transient working periods, between the amount of energy supplied to and the amount of energy actually required by a machine or other energy consuming device at any given time. On the other hand, it is equally well known that in practically all transportation means as well as in the case of a great many machines, large masses must, as a matter of routine operation, be subjected to rapidly changing states of motion. Consequently, according to prior practice wherein fly-wheels have been employed primarily only for the purpose of equalizing or balancing periodically recurring transient differences between energy supply and energy demand, it has been necessary to provide power considerably in excess of that required to maintain a machine in motion at a normal rate of speed in order that the machine may be accelerated when required. On the other hand, when the motion of a machine is to be decreased, this usually has been effected in accordance with prior practice by some sort of braking means, or, in other words, by the dissipation of kinetic energy. Consequently, according to prior practice power provisions have been excessive and very considerable losses of energy have been occasioned by the acceleration of masses and by the dissipation of such excess energy as may be undesirable at any given time.

While as stated, fly-wheels have been employed heretofore primarily to equalize or balance periodically recurring transient differences between the amount of energy supplied to and the amount of energy actually required by a machine at any given time, there are exceptions to this rule. For example, arrangements have been proposd heretofore to utilize fly-wheels to master and handle marked increases in power requirements by having the fly-wheels act at times to accumulate energy from a power device and to give up such stored energy upon the occurrence of transient rises in power demands, one arrangement of this kind which perhaps is best known residing in the electric drive of rolling mills by the aid of comparatively small driving motors. However, while some energy is conserved by such arrangements, the amount of energy actually conserved is comparatively slight as compared with the energy losses, and there has continued to remain the problem of avoiding the tremendous energy losses occasioned in the deceleration of machines.

Accordingly, one important object of the present invention is to provide, in combination with a fly-wheel mass acting as an energy accumulator, novel and practical means whereby the energy, or at least a major part of the energy heretofore dissipated in effecting the deceleration of a machine or other energy consuming device, is stored in the fly-wheel mass for subsequent use to effect, for example, starting or acceleration of the machine or energy consumer.

More particularly the invention has in view to provide, in combination with a fly-wheel mass acting as an energy accumulator, novel and practical means whereby there is stored in such mass for subsequent advantageous use, not only the energy heretofore dissipated in effecting deceleration of a machine or energy consumer, but also such excess energy as may be produced at times by the power plant. Thus, there is effected not only a vast saving in power or energy, but power requirements are proportionately lessened.

According to one phase of the invention there is provided between a fly-wheel mass and a machine or energy consumer, a novel gearing whereby, during acceleration periods of the machine or consumer, energy is transmitted from the fly-wheel mass to the machine or consumer, and, during deceleration periods of the machine or consumer, energy is transmitted therefrom to the fly-wheel mass.

Assuming that the fly-wheel mass has a definite normal speed, it will, in the course of energy yield, be unable to preserve such speed. Assuming also, as is frequently the case, that a machine or consumer is required to operate at a constant speed or at a predetermined variable speed, it is manifest that in order to effect stabilization of the speed of the machine or consumer the ratio of the gearing between the fly-wheel mass and the machine or consumer must constantly be changed. In other words, the decrease of the energy accumulated in the fly-wheel on the one hand, and the stabilization of a predetermined speed of the machine or consumer on the other hand, always is reflected in a required change in the ratio of the gearing between the fly-wheel mass and the consumer. Accordingly, another important object of the invention is to provide, between an energy consumer and a fly-wheel mass acting as an energy accumulator, not only a novel gearing of the character mentioned the ratio of which is adjustable to any required value, but means for automatically regulating such gearing in accordance with requirements. A gearing or transmission of the type herein referred to must therefore have a certain range within which the ratio can be changed or varied continuously, and such gearings are hereinafter termed "variable ratio gears or transmissions." In the following description, a variable ratio friction gear has been chosen as an example for a transmission having the required characteristics.

With the foregoing and various other objects in view, which will become apparent as the nature of the invention is better understood, the same consists in the novel combination and arrangement of features as will be hereinafter more fully described, illustrated in the accompanying drawings and defined in the appended claims.

In the drawings:

Figure 6 is a vertical section illustrating novel means for coupling an energy consumer with a fly-wheel in accordance with the invention.

Figure 8 is a detail section on the line 10—10 of Figure 6.

Figure 1:
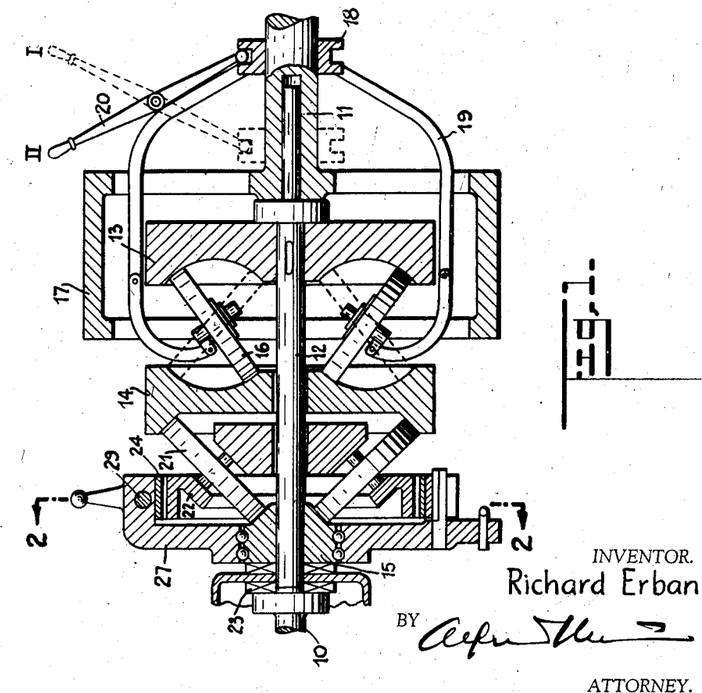
Figure 1 is a longitudinal sectional view through a gear of a type which may be combined with a fly-wheel and an energy consumer and with a fly-wheel and power plant to accomplish the purposes of the invention.
Figure 2:
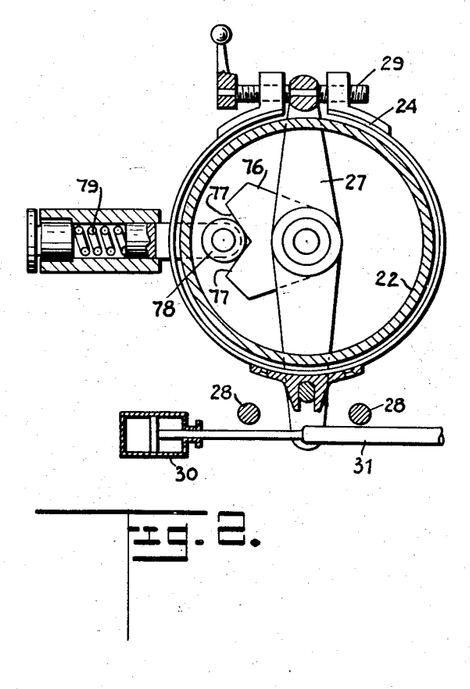
Figure 2 is a transverse section on the line 2—2 of Figure 1.

Referring to the drawings in detail, first with particular reference to the variable ratio friction gear of so-called differential type illustrated in Figures 1 and 2, and designated generally, by the letter A, or by the letter A with superscripts, in Figure 1 and other figures, 10 and 11 designate driving and driven shafts, or vice versa, and 12 designates an intermediate, relatively rotatable shaft on which are mounted race rings 13, 14 and 15, respectively. The race rings 13 and 14 are, respectively, fixed to and rotatable relative to the shaft 12, and between the adjacent surfaces of said rings, which surfaces are of toric form, are interposed rollers 16 which are carried by and mounted for tilting movement within a carrier 17 to vary the gear ratio between said race rings. The carrier 17 constitutes part of, or is fixed to, the shaft 11, and on said carrier is slidably mounted a collar 18 which is suitably connected, as indicated at 19, with the rollers so that by sliding movements thereof the rollers may be tiltably adjusted between the full and dotted line positions shown. At 20 is designated a lever which is operatively connected to the collar 18 for effecting sliding movements thereof.

The race ring 15 is rotatable and axially movable relative to the shaft 12, and between the adjacent toric surfaces of this race ring and the race ring 14 are interposed rollers 21 which are carried by a cage 22 and which have fixed angles of inclination relative to the shaft 12, and establishing a low speed of the race ring 14 as compared with the speed of the shaft 10. The shaft 10 is connected with the race ring 15 through a device designated generally as 23 which operates in response to differences in torque between the shafts 10 and 12 to impose thrust on the race ring 15 and thus maintains the several race rings and rollers in tractive engagement.

At 24 is designated a brake band for cooperation with the cage 22, and, as is apparent, when this brake band is released the planetary gearing 15—21—14 simply idles. On the other hand, when said brake band is clamped about the cage 22 and the latter thus is held against rotation, rotation of the race ring 15 with the shaft 12 will result, through the rollers 21, in rotation of the race ring 14 in an opposite direction. The race ring 13, being fixed to the shaft 12, rotates therewith. Consequently, the rollers 16 are subjected to the two different speeds in opposite directions of the race rings 13 and 14, and said rollers therefore will revolve about the shaft 12 at a speed depending upon the angles which they form with the gear axis. In their dotted line positions the rollers 16 contact with the race ring 13 at relatively low speed points and with the race ring 14 at relatively high speed points. Consequently, if the rollers 16 and 21 have equal and opposite angles of inclination relative to the shaft 12 the rollers 21 will not revolve about the shaft 12 but will simply rotate on their own axes, and for any speed of either shafts 12 or 11 the speed of the other will be zero. On the other hand, when the rollers 16 are adjusted to their full line positions they will contact with high speed points on the race ring 13 and at low speed points on the race ring 14, with the result that the rollers 16 and their cage will revolve about the shaft 12 at maximum speed. Any adjustment of the rollers 16 from their full line positions towards their dotted line positions will result in lower speed of the shaft 11, and as the adjustment is continued the speed of the shaft 11 will gradually decrease until it stops. When the rollers 16 are in their full line positions the lever 20 is in the position indicated as II, and when said rollers are in their dotted line positions said lever 20 is in the position indicated as I. In other words, the lever 20 is movable between the positions I and II to adjust the rollers between their dotted and full line positions.

A gear or gears, not necessarily of the specific design but of the general type and having the principle of operation of the gear illustrated in Figure 1, is or are employed in carrying out the present invention as illustrated in Figures 3 to 10 of the drawings.

Figure 3:
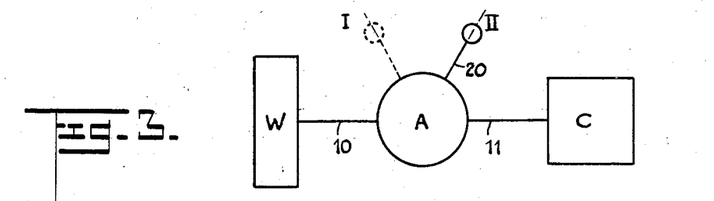
Figure 3 is a diagrammatic illustration of a fundamental embodiment of the invention.

Referring first to the fundamental embodiment of the invention diagrammatically illustrated in Figure 3, it will be observed that a variable ratio friction gear of the so-called differential type such as the gear shown in Figure 1 and designated A in Figure 3 and following figures is interposed between a fly-wheel mass designated as W and a machine or energy consumer designated as C, and that the shafts 10 and 11 of said gear are connected, respectively, to the fly-wheel mass and the consumer, the motor drive or power source being for the moment disregarded. Assuming the flywheel W' rotates at a certain speed and thus has a store of kinetic energy, any part of this energy can be transferred to the consumer C by the proper adjustment of the lever 20, i. e., by shifting the lever 20 from its I position towards its II position. In this connection it is pointed out that adjustment of the lever 20 may be effected either manually or by means of a governor or equivalent device more fully explained hereinafter. Now, assuming that the consumer C is to be stopped or that its speed is to be reduced, then by adjusting the lever 20 towards its I position the gear ratio is so altered that the fly-wheel mass is driven by the consumer. Thus, the fly-wheel mass is utilized to arrest the consumer and at the same time the energy which is given up by the consumer is stored in the fly-wheel to subsequently be used for starting or accelerating the consumer by the simple expedient of again adjusting the lever 20 towards its II position.

Figure 4:
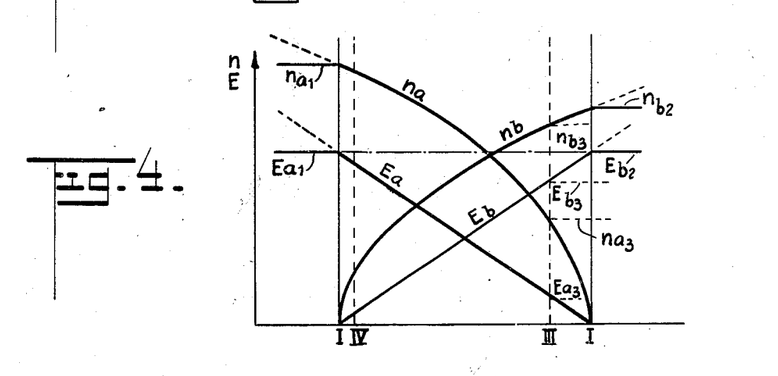
Figure 4 is a diagram illustrating graphs of energies and speeds.

Figure 4 illustrates graphically the trend of the speed and the kinetic energy curves of the fly-wheel mass W and the consumer C for different positions of the gear lever 20, or, in other words for different gear ratios of the gear A effected by changing the radii between the center of the shaft 12 and the points of contact of the rollers 16 with the race rings 13 and 14, respectively. The assumption is made in this connection that position I of the lever corresponds to a 1:0 ratio of the gearing and position II to the ratio 0:1. Inasmuch as the kinetic energy increases with the square of the speed, then, if the energy is represented by a linear function, the speeds assume parabolic form. In position I of the lever 20 the speed of the fly-wheel W has a value represented as $Na_1$ and the corresponding energy has a value represented as $Ea_1$, whereas the speed and the energy of the consumer C are of zero value. In position II of the lever 20 the speed of the consumer C has a value represented as $Nb_2$ and the corresponding energy has a value indicated as $Eb_2$, while both the speed and the energy of the fly-wheel W are of zero value. For adjustments of the lever 20 from position I towards position II the energy content decreases steadily in the fly-wheel W, while the energy content of the consumer C grows in a similarly steady manner. The total of the energies of W and C must always be equal to the initial or final energy $Ea_1$ or $Eb_2$ as indicated by the dot and dash horizontal line, but of course, due to the different masses or inertias of the fly-wheel and the consumer, the corresponding speeds are not alike.

Now, if a transmission gear is employed which has only a restricted ratio, say a range between 1:0 and 2:1, it will be apparent from the diagram that the speed and the energy of the fly-wheel will not drop to zero. For instance, for the point marked III on the diagram (ratio 1.84:1) there are found values which result from the intersection of a perpendicular in III with the graphs, that is, a minimum speed of $na_3=0.416$ $na_1$ and an energy $Ea_3=0.174$ $Ea_1$. The final energy of C, $Eb_3$ will then fall below $Eb_2$ by the same amount $$(Eb_3 = 0.826\ Ea_1;\ nb_3 = \sqrt{0.826.nb_2} = 0.91\ nb_2).$$

If, then another gearing were used which in position I would result in a maximum ratio of only about 1:4 rather than 1:0 it will be seen that the resultant values for speeds and energies are determined by the intersection of the perpendiculars in IV with the respective graphs. If the consumer C in position I of the lever 20 is arrested, this may be accomplished by a brake, but its residual energy will then be destroyed. In other words, it is apparent that the use of a gear with a limited regulating range means the loss of some energy. However, this loss is relatively slight. If the maximum ratio of the gear is as 1:4 as stated, the resultant loss will be 0.0625 $Eb_2$ or 0.075 $Eb_3$. If, however, the speed ratio for point IV had amounted to $Ca$ 1:6 the resultant loss would have been only 0.034 $Eb_3$ or less than one-half of what it was before, whence the inference may be drawn that the losses occasioned by imposing certain restrictions upon the regulating range of the gear becomes negligibly small in practice by the adoption of very small values for the gear ratio.

Reverting to Figures 1 and 2 of the drawings, it will be observed that the brake band 24 is mounted on a spider 27 which is rotatable about the shaft 12 within limits as determined by the spacing of a pair of stops 28, 28, and that when the brake band is clamped on the cage 22 as by means of the screw 29, the spider will rotate through a small angle between the stops 28 depending upon the direction of the reaction torque in the gear i. e., depending upon whether the shaft 10 becomes the driving or the driven shaft. Preferably, but not necessarily, a dash pot or equivalent device 30 is connected with the spider to prevent clashing of the same against the stops 28. Where a motor or other source of power is provided to drive the consumer, it follows from a consideration of Fig. 3 that the driving connection can be made either directly to the fly-wheel, or directly to the consumer. In some cases it is preferable to provide a two-way clutch through which the drive may be established to either of them at will; this clutch can be made responsive to the direction of the power flow, or, what practically amounts to the same, to the direction of the reaction torque of the gear. This is done by operating said clutch through the rod 31 of Fig. 2, and this arrangement is more fully described in connection with Fig. 10. In such other cases, where the consumer operates at substantially the same speed as the power source, it is advantageous to connect the power source directly to the consumer, and only indirectly, through the transmission, to the fly-wheel.

Figure 5:
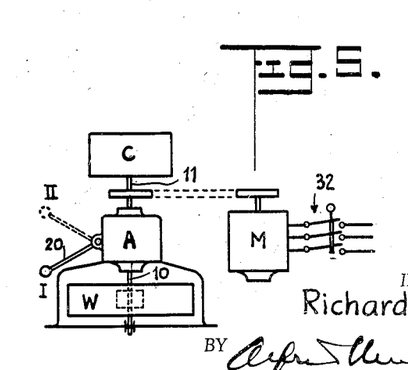
Figures 5 and 6 are views illustrating an embodiment of the invention.
Figure 6:
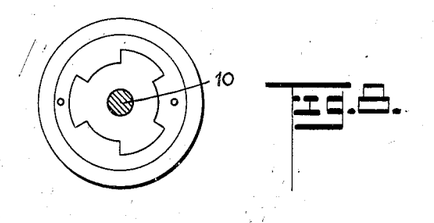
Figure 7:
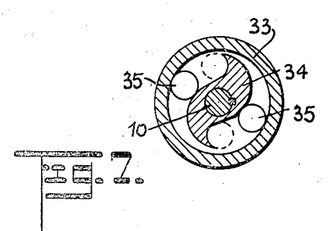
Figure 7 is a detail section on the line 9—9 of Figure 6.

Figure 5 illustrates an arrangement as last mentioned and as applied, for example, to an energy consumer C in the form of the basket of a centrifugal machine. On the frame of the machine is mounted a gear A, and connected with the shafts 10 and 11 of said gear are the fly-wheel W and the basket or energy consumer C, respectively, the fly-wheel being connected to the shaft 10 through the instrumentality of a free wheeling clutch as illustrated in Figures 6 and 7 and later to be described in detail. The drive from the motor M is effected by any suitable form of connection between the motor and the shaft 11, and starting of the motor is controlled, for example, by means of a starter 32 as is customary.

The operation of the arrangement illustrated in Figure 5 is as follows: The motor M is started and this operates the consumer C at the required speed. While the consumer is operated by the motor the lever 20 of the gear A is in its II position so that the fly-wheel is driven at the lowest possible speed. If, then, the speed of the consumer is to be reduced, or if the consumer is to be stopped and after the lapse of a short period of time it is to be re-accelerated, the motor M is cut off as, for example, by means of the starter 32, and the lever 20 is thrown from its II position to its I position. Thus, by transfer of energy from the consumer through the gear A the speed of the fly-wheel W is increased and the consumer is brought to a stop. If, now, the consumer is again to be started, the lever 20 is thrown from its I position towards its II position so that the fly-wheel drives the consumer at a gradually increasing speed until the desired speed is attained, whereupon the motor M may be re-connected. In this way the acceleration imparted to the consumer may be rather rapid, since the motor M with its limitations is not required to effect the acceleration.

The arrangement illustrated in Figure 5 is an exemplified embodiment covering a case where the motor is to be periodically disconnected entirely, and is of particular advantage when there is employed a motor which must be brought to a certain minimum speed or which requires a special device for starting. Such a special device, as the starting resistance in electric motors or the starter of an internal combustion engine, may here be dispensed with since an electric motor can be run up to full speed by the fly-wheel prior to its connection with the supply line, while, in the case of an internal combustion engine, the fly-wheel may be employed to perform the work of accelerating the rotating and reciprocating parts thereof. Moreover, an arrangement of this kind not only permits plant simplification by avoiding the necessity of a starting device in many instances, but above all it effects a very considerable saving in energy, not only because an electric motor may be cut off and an internal combustion engine may be permitted to idle with low fuel consumption during intervals when consumption of energy ceases, but primarily because the energy expended for acceleration is in a large measure derived from the energy expended in deceleration.

In order that, during extended periods of rest of the consumer C, idling friction of the gear A may in a large measure be avoided, a free wheeling clutch preferably is interposed as aforesaid and as illustrated in Figures 6 to 8 between the fly-wheel W and the gear shaft 10.

Referring to Figures 6 to 8, it will be observed that the fly-wheel W is supported for rotation relative to the shaft 10 of the gear A and that said fly-wheel has fixedly connected thereto a circular collar or casing 33 within which is disposed a non-circular cam or disk 34 which is fixed to said shaft 10, while between said collar and said cam or disk are rolling bodies 35. Thus, the fly-wheel is free to rotate relative to the shaft at a higher speed than the shaft, but when the speed of the shaft exceeds that of the fly-wheel the bodies 35 are jammed between the collar 33 and the cam or disk 34 and the fly-wheel is required to rotate with the shaft.

By means of the free wheeling clutch just described it is apparent that power transmission may be effected from the consumer C to the fly-wheel, but not from the fly-wheel to the consumer. If, therefore, after a stopping period of the consumer the energy of the fly-wheel again is to be transmitted to the consumer, means must be provided to operatively connect the fly-wheel with the shaft 10 when the fly-wheel is rotating at a higher speed than said shaft. Accordingly, the fly-wheel W is suitably provided with teeth or dogs 36 for cooperation with companion teeth or dogs 37 on a sleeve 38, which sleeve is splined on the shaft 10 for sliding movement therealong to engage and disengage said dogs or teeth 36, 37. Consequently, when the dogs or teeth are engaged the fly-wheel is effective to drive the shaft.

In order to facilitate engagement of the dogs or teeth 36, 37 there preferably is employed a friction clutch to bring the shaft 10 up to the speed of the fly-wheel before engagement of the dogs or teeth is effected. Accordingly, the fly-wheel W and the sleeve 38 are provided in the present instance with cooperating conical clutch elements 39 and 40, respectively, one of which is suitably mounted to yield under the influence of engaging movement of the other, and, as shown, said clutch elements are disposed to become engaged prior to engagement of the dogs or teeth 36, 37. Consequently, when the sleeve 38 is shifted to connect the fly-wheel with the shaft 10 the initial connection is established through the frictional or non-positive clutch elements 39, 40 and initiation of rotation of the shaft 10 is effected prior to positive coupling of the fly-wheel with the shaft by continued shifting of the sleeve to engage the dogs or teeth 36, 37.

In the present instance the female clutch element 40 is rigid with the sleeve 38 and the male clutch element 39 is splined to a hub-like portion of the fly-wheel W and has fixed thereto pins 41 which are freely slidable through lugs 42 which project laterally from said hub-like portion, coil springs 43 being interposed between said lugs and the clutch element 39 to urge the latter towards the clutch element 40 and to permit the same to yield under the influence of engaging movement of the clutch element 40, and heads being provided on said pins for engagement with said lugs 42 to limit movement of said clutch element 39 under the influence of said springs.

It is advantageous to provide for automatic engagement and disengagement of the clutch elements 39, 40, 36, 37 by shifting movements of the lever 20 of the gear A towards its II and I positions, respectively. Accordingly, there is provided in the present instance a longitudinally slidable rod 44 to which is fixed an arm 45 having a forked or otherwise suitably shaped end which is engaged in an annular channel in the sleeve 38, and between said arm and a suitable fixed abutment, such as the base of the machine, is interposed a coil spring 46 which tends constantly to shift said rod and arm to move the sleeve 38 in a direction to effect engagement of the clutch elements 39, 40, 36, 37. Further, the gear lever 20, instead of being directly operable to actuate the gear A, is coupled with said gear through an arm 47 so as to be capable of movement in the direction of and beyond its I position, and this additional movement of said lever is employed to effect disengagement of the clutch elements. In other words, a rod 48 extends from the lever 20 loosely through the arm 47 and between said arm and a stop 49 on the free end position of said rod is interposed a coil spring 50. Consequently, when the lever 20 is swung to its I position the gear A is actuated to its corresponding position through the rod 48, the spring 50 and the arm 47, but obviously the lever 20 is capable of continued movement beyond its I position due to its yielding connection through the spring 50 with the arm 47. The rod 44 has its free end disposed to be engaged by the lever 20 when the latter has reached its I position. Consequently, when said lever 20 is shifted from its II position to its I position the I status of the gear A first is established and then, by continued movement of said lever beyond its I position the rod 44 is moved longitudinally against the action of the spring 46 and the clutch elements 36, 37, 39, 40 thereby are disengaged. On the other hand, immediately the lever 20 is released, the spring 46 is released and operates to effect engagement of said clutch elements.

The operation of the foregoing arrangement is as follows: If the lever 20 is shifted from its II position to its I position the ratio of the gear A is changed so that the shaft 10 rotates faster than the fly-wheel W and thereby energy is transmitted from the consumer C to the fly-wheel. If, then, the movement of the lever 20 is continued the clutch 36, 37, 39, 40 is disengaged and only the free wheeling clutch 33, 34, 35 remains, coupling the shaft 10 with the fly-wheel. When braking the consumer C by transfer of energy therefrom to the fly-wheel there eventually arises a phase when energy no longer is transmitted to the fly-wheel due to the consumer being brought to a state of rest. Immediately this condition occurs, however, the clutch 33, 34, 35 obviously becomes automatically disengaged and, therefore, the only losses of the energy stored in the fly-wheel are confined to bearing friction and windage of the fly-wheel. After the consumer has been brought to a stop and assuming that it is then desired to start the same, this is effected by releasing the lever 20 and permitting it to return to its I position, the spring 46 then acting as aforesaid to engage the friction clutch elements 39, 40. Thus the speed of the shaft 10 initially is raised to the speed of the fly-wheel W, whereafter a progressive acceleration of the shaft 11 and the consumer is effected by shifting of the lever 20 from its I position to its II position.

While in most instances use of a free wheeling clutch between the fly-wheel and the shaft 10 is desirable, its use is not in all cases essential. For example, if a gear A is employed having an infinitely high ratio of adjustment, stopping of the consumer C may be effected solely by transmission of energy therefrom through the gear to the fly-wheel and the latter may be fixed to the shaft 10 of the gear. However, after stopping of the consumer C and the shaft 11 the fly-wheel would have to give up energy to cover idling losses of the gear. Thus, while not essential, use of the free wheeling clutch is desirable. Moreover, its use is substantially always desirable whenever a gear A is used which does not permit stopping of the shaft 11 at maximum speed of the shaft 10, that is to say, when a gear is used whose ratio does not extend entirely to 1:0. In such a case the shaft 11 must be stopped by some sort of a brake and this would mean, of course, stopping of the shaft 10 and the fly-wheel, wherefore in such a case use of a free wheeling clutch is necessary.

Braking of the shaft 11 may be effected by braking of the shaft 10, assuming that the ratio of the gear A for position I of the lever 20 has a finite value, and Figure 6 additionally illustrates such an arrangement. A friction ring 51 simply is stationarily mounted in a position such that it is engageable by the clutch element 40 after the same has been moved to disengage the dogs or teeth 36, 37.

According to each of the arrangements hereinbefore described the assumption has been that regulation of the gear A is effected only manually. However, in most cases it is desirable to control the regulation automatically, not only to assure proper operation but to insure against such manipulations as might harm the mechanism, the dangers in the latter connection residing in the potential developments of such torques and high rates of speed as might destroy the mechanism. In a system as herein disclosed for storing energy, the forces arising as a result of energy exchange are a criterion for the speed or rate of the exchange. The more rapidly the exchange occurs the greater will be the occurring forces, and vice-versa, regardless of the absolute speed of the masses, since the energy is the decisive factor. If, therefore, the regulating speed is not suitably controlled but is permitted to take place too rapidly, destructive torques may easily be developed. Accordingly, automatic control of the speed of regulation of the gear A is extremely desirable.

Figure 10:
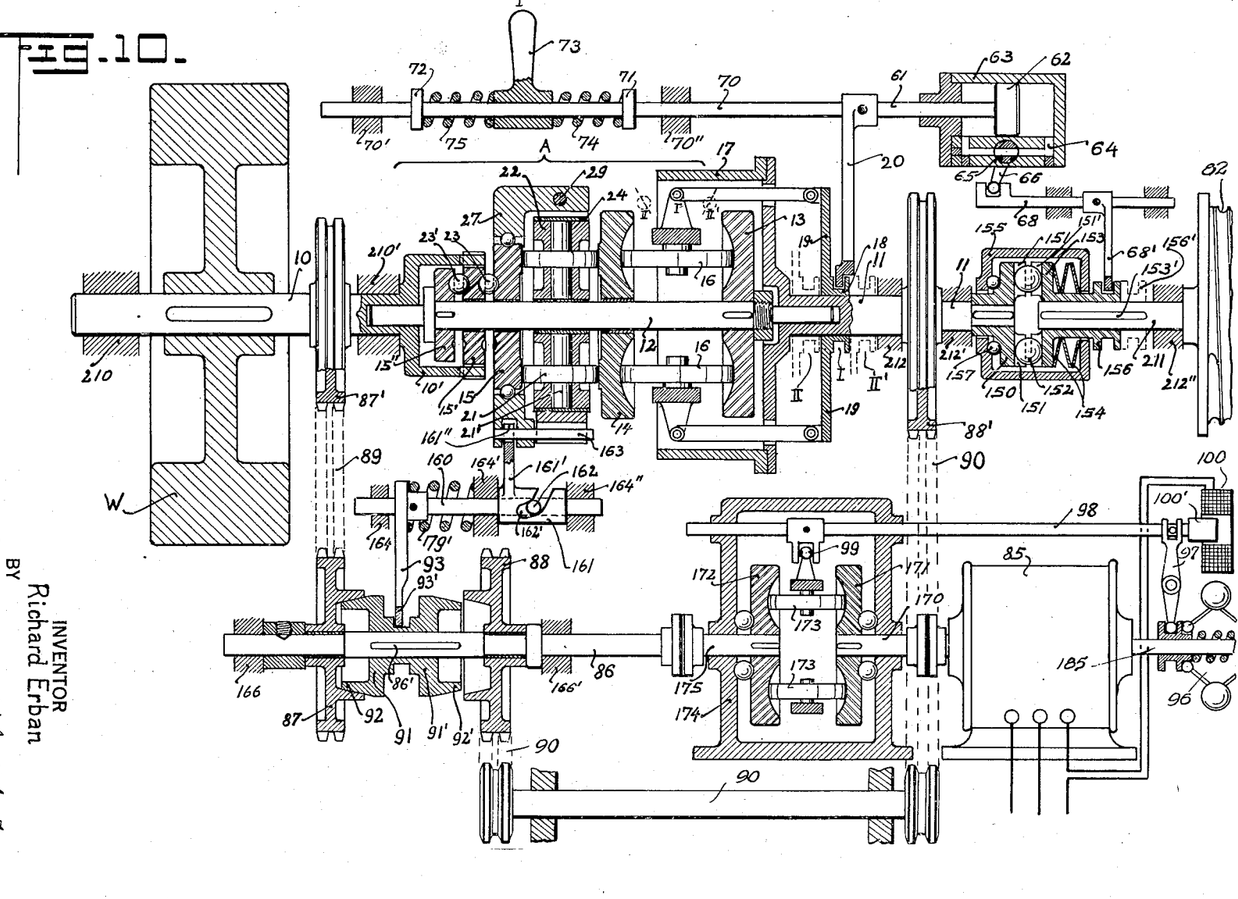
Fig. 10 is a view, showing in detail and in section the structure of a preferred form of the invention.

This can be accomplished in several ways; one of the preferable arrangements operates in such a way that the flow of power between the flywheel and the consumer controls the ratio change. As a result, changes which are too rapid, so that they would cause excessive loads upon the mechanism are prevented by the increasing load itself. A simple manner to obtain a control in response to the power, or load upon the mechanism, consists in a device responsive to the torque transmitted between the flywheel and the consumer. An arrangement of this kind is indicated in Figs. 1 and 2, where the reaction torque of the transmission is used to operate a mechanism responsive to its magnitude. Another arrangement is shown in Fig. 10, where a separate dynamometer is placed in the shaft driving the consumer.

Reverting to Figures 1 and 2, it will be observed that a member 76 is suitably fixed to the spider 27 so as to be angularly movable therewith, and that said member is formed with a pair of oppositely directed cam surfaces 77, 77 which, together, form a substantially V-shaped notch in the member. It will be observed further that a cam follower in the form of a roller 78 is urged against the cam surfaces 77, 77 by a spring 79 and that, due to the V-shaped relative disposition of said surfaces the spider 27 thereby is held in a central position spaced from the stops 28 as long as the spider is not subjected to reaction torque. However, depending upon the direction of any reaction torque which may be developed, the tendency of the spider will be to swing in one direction or the other, thereby compressing the spring 79. It is apparent, therefore, that by suitable selection of the shape and disposition of the cam surfaces and the pressure of the spring 79, the rocking angle of the spider can be regulated in accordance with required control of the mechanism, and that, therefore, said spider may be employed to control the transmitted torque, for, reverting to Figure 10, wherein the spider is designated as 22—27, it is manifest that the axial movement of the rod 160 may be employed to actuate the throttle valve 65. Moreover, since the reaction torque of the gear A may represent either the sum of the torques of the shafts 10 and 11, or the difference between their respective torques, as set forth in my U. S. Patent 2,127,588, different kinds of regulation obviously are obtainable by use of an element such as the spider 27 operating in response to the reaction torque to control the gear.

The preferred form of an embodiment of the invention is particularly well suited for the driving of elevators and other forms of cable haulage equipment. Such an arrangement is shown in detail in Fig. 10. The flywheel W is keyed to the shaft 10, which carries also the sprocket wheel 87' and is supported in the bearings 210 and 210'. An extension 10' of the shaft 10 forms the driving connection between the flywheel and the transmission, whereby the speed of the driven energy consumer 82 may be varied from zero to maximum both forwards and in reverse. The transmission itself is similar to that shown in Figs. 1 and 2, except that in order to obtain a speed range for the driven shaft going from forward through zero to reverse, the inclination of the rollers 21 is shown with their axis of rotation at approximately right angles to the transmission axis.

The extension 10' of the driving shaft 10 engages the torque-loader disc 15', which by means of the pressure balls 23 and 23' drives the elements 15 and 15" respectively. Element 15" is keyed to the shaft 12, while element 15 forms one race for the rollers 21, the other race being formed by the element 14. The rollers 21 are freely rotatable upon the shafts 21', and are carried by the cage 22. This cage 22 is carried by the main shaft 12, so that it can freely rotate thereon, and it is prevented from such rotation by a brake band 24 and the parts 29—27 as more fully shown in Fig. 2. The race 14 is carried freely rotatable on the shaft 12 and together with the race 13, which is keyed to the shaft 12, forms the raceways for the tiltable rollers 16. Change of the position (angle of tilt) of these rollers is obtained by axial displacement of the element 19 through the collar 18 and the fork 20. The rollers 16 are articulated in a carrier 17 in any preferred or known manner, such as shown in Erban U. S. Patent 1,958,502. The carrier 17 is secured to or forms part of the driven shaft 11 which is supported by the bearings 212 and 212'. A sprocket wheel 88' is keyed to the shaft 11.

The shifting fork 20 is carreid by the rod 61 which is connected to the piston 62, movable within the cylinder 63. The cylinder, which is filled with a suitable fluid, is closed on both ends and has a duct 64 that connects the spaces at both sides of the piston. A valve 65, operable through the crank 66, may be operated to throttle the circulation of fluid in the duct 64, or close it completely. The fork 20 is connected at its other side to the rod 70, which is slideably supported in the bearings 70 and 70". The element 73 is also slideable upon the rod 70, and is placed between two abutments 72 and 73 fixed to the rod 70. Two springs 74 and 75 are placed between the element 73 and the abutments, so that when the handle of the element 73 is pushed to the left, spring 75 will be compressed and tend to slide the rod 70 to the left, and vice versa.

The shaft 11 has keyed thereto at its right end the element 150, provided with two recesses 151 that are V shaped. A shaft 211 is in alignment with the shaft 11, and carries the element 153 which is slideable thereon. A key 153' causes the element 153 to rotate in unison with the shaft 211. Recesses 151' are provided on 153 in opposed position to the recesses 151, and balls 152 are inserted between the V shaped faces. A spring 154 pushes the element 153 toward the element 150. A casing 155 bears against the spring 154 on one side and against the thrust bearings 157 on the other side. When torque is transmitted by this device, the balls 152 will climb up on the V shaped faces thereby compressing the spring 154 until a balance is reached. If then the torque increases further, the balls will move up further and push the element 153 to the right, while a decrease of the torque will enable the spring to push the part 153 to the left. These movements of the part 153, which are dependent upon the torque transmitted between the shafts 11 and 211, are transmitted by the collar 156 to the fork 68', which is slideably carried by the rod 68. The rod 68 has an operative connection to the crank 66 which operates the valve 65, so that this valve will be gradually closed when the torque transmitted between shafts 11 and 211 increases, and gradually opened when this torque decreases.

The shaft 211 is supported by bearings, one of which is shown at 212", and is drivably connected to the drum 82. It is obvious that this connection need not be a direct drive and that any reduction gear between the shaft 211 and drum 82 would only reduce the speed of the drum relatively to the shaft, without in any way altering the relationship between the different parts shown in the drawing.

An electrical motor 85 is coupled to the drive shaft 170 of a variable speed transmission that comprises the races 171 and 172, and the tiltable rollers 173. The driven shaft 175 of this transmission is coupled to the shaft 86 which is supported by the bearings 166 and 166'. Freely rotatable upon this shaft 86 are two sprocket wheels 87 and 88 respectively. A double clutch member 91—91' is slideable upon the shaft 86, but splined thereto by key 86'. It has a clutch surface 92 which can engage the wheel 87 and on the other end is provided with a clutch surface 92', for engagement with the wheel 88. The clutch member 91—91' can be operated by axial movement of the fork 93. A rod 160, supported by the bearings 164, 164' and 164", carries the fork 93 fixed thereto. The spring 79', located between the fork 93 and the bearing 164' normally keeps the fork 93 in the left hand position and thereby causes engagement of the clutch element 91 with the surface 92 on the wheel 87. A chain drive 89 forms a drivable connection between the wheel 87 and the wheel 87' which is positioned on the shaft 10 of the flywheel W.

A member 161 is positioned rotatably upon the rod 160, and placed between the bearings 164' and 164", so that the member 161 can rotate, but cannot move axially. The member 161 is provided with an inclined slot which cooperates with the pin 162 fastened to the rod 160. Limited angular movements can be imparted to the member 161 through the crank 161'. Such angular movements of 161 will cause a longitudinal movement of the rod 160 through the action of the inclined slot 162' upon the pin 162. The crank 161' has on its upper part a forked end 161", which engages the pin 163 carried by the member 27, and which is angularly movable under the influence of the roller carrier 22 described above. The mechanism just described will therefore cause an operation of the clutch 91—91' under the influence of the forces or torques of the roller carrier 22 of the transmission between the flywheel W and the drum 82.

The sprocket wheel 88 is drivably connected through a chain drive and a lay-shaft 90 (indicated by the dotted lines, Fig. 16) to the sprocket wheel 88' keyed to the shaft 11. Movement of the clutch 91—91' to the right will therefore establish a driving connection between the shaft 86 and the shaft 11.

The speed of the variable transmission 174 can be changed in any known manner, as for example, as indicated by the elements 99 and the rod 98. The motor shaft 185 carries a centrifugal governor 96, which operates the rod 98 through the link 97. The arrangement is such, that an increase of speed of the motor shaft 185 will move the rod 98 to the left to operate the transmission 174 to increase the speed of the shaft 175. This increases the load upon the motor, and prevents a further increase of the motor speed. Vice versa, a decrease of the motor speed will change the ratio of the transmission 174 so as to reduce the load upon the motor. A similar control of the ratio of the transmission 174 can be obtained by the solenoid 100 which acts upon the armature 100', fixed to the rod 98. Increasing current to the motor will cause a movement of the rod 98 to the right and thereby decrease the speed of the shaft 175 and the load upon the motor.

Upon starting the motor 85, the transmission 174 will be in low speed position, and the clutch 91 will be in engagement with the wheel 87 through the action of the spring 79'. Therefore, the motor will begin to accelerate the flywheel W. Since the transmission A is set to zero ratio, that is a position where the speed of the output shaft 11 is zero, the motor will continue to load up the flywheel, and while the flywheel is increasing its speed, the motor also will increase its speed, which will cause two things, namely, (1) the current flowing to the motor will decrease and this will decrease the pull of the solenoid 100 upon the armature 100', thereby releasing the rod 98 to move to the left under the influence of the centrifugal force of the governor, and (2) the governor itself will tend to move the rod 98 to the left due to the increase of centrifugal force. These two actions will therefore change the ratio of transmission 174 so as to further increase the speed of the shaft 86 and the flywheel W, while keeping the load upon the motor fairly constant. This continues until the ratio cannot be increased further; the flywheel has then reached its maximum speed and the mechanism is ready to deliver energy to the consumer 82. If it is now desired to accelerate the drum 82 in the same direction as the flywheel W is rotating, the control knob 73 is moved toward the left side. This will cause the spring 75 to be compressed and to move the rod 70 to the left, thereby causing the fork 20 to move the collar 18 and the shifting member 19 to move and tilt the rollers 16 so that they contact the race 13 in a larger circle than the race 14. Since race 13 rotates in the same direction as the flywheel W, the rollers 16 and their carrier 17 will revolve around the shaft 12 in the same direction as the flywheel W. This may be termed "forward."

The shaft 11, driven by the carrier 17, now begins to rotate and in turn, drives the element 150 which is keyed to it. The balls 152 cause the element 153 to rotate, thereby driving the shaft 211 and the drum 82. As has been explained above, the balls 152 will climb the inclines 151 on part 150 and thereby cause axial displacement of part 153, which in turn moves the collar 156 and the fork 68' to the right. This movement is transmitted to the valve 65 by the rod 68 and the crank 66, thereby throttling the flow of fluid through the duct 64, and slowing down the speed with which the piston 62 may move in the cylinder 63. The greater the torque transmitted by the mechanism 150—152—153 to the drum 82, the greater will be the displacement of the fork 68' and the greater the throttling effect of the valve 65, until, when a predetermined maximum is reached, the valve 65 will be closed altogether. So long as the valve is closed, the piston 62 cannot be moved, and no change of the ratio of transmission A can take place, until the torque transmitted to the drum 82 has dropped sufficiently to cause the mechanism 150—152—153 to open the valve 65 again.

It is obvious that this controlling action will take place whether the initial movement of the member 73 was made manually or by some automatic or auxiliary power device. In each case, the mechanism will serve to prevent the power delivered from the flywheel to the consumer to exceed a predetermined maximum. Inspection of the mechanism 150—152—153 shows that it will operate as described whether the torque is transmitted from the element 150 to the element 153, or vice versa. In other words, it will cause displacement of the collar 156 also when power is transmitted from the shaft 211 to the shaft 11. This occurs whenever the handle 73 is moved so that the speed of the drum 82 is decreased, thereby transferring energy of motion from the drum to the flywheel. Thus the device 150—152—153 serves to control the rate of ratio change of transmission A dependent upon the power transfer between the flywheel and the energy consumer under all circumstances.

Movement of the handle 73 to the right of its neutral position I will cause the drive shaft 11 to rotate in a direction opposite to that of the flywheel, and thus rotate the drum 82 in "reverse." Under this condition, the operation of the device 150—152—153 will be similar to that described above.

It remains to describe the operation of the chain drive 88—88' and the engagement of the cluth 91' with the sprocket wheel 88. In cases where the power requirements of the driven consumer (drum 82) call for delivery of the motor power to the consumer over protracted periods, it appears that with the equipment so far described, this motor power will pass two transmissions; first the transmission 174, and to the flywheel; and then the transmission A from the flywheel to the consumer. This would involve greater losses than where the motor power is delivered directly to the wheel 88'. Moreover, when the time, during which the energy consumer is at standstill, or low speed, is short compared to the running period, it is preferable to transmit the motor power directly to the consumer, because the rest periods are too short to transfer any substantial amount of energy to the flywheel during that time, without causing considerable peak loads on the motor. It is then very desirable to connect the motor to the consumer, so that energy will be transmitted thereto independent of the energy flow of the flywheel, and this is obtained by operation of the clutch mechanism 93—91'—92'—88 and the driving connection 88—90—88'. Shifting of the fork 93 to the right will thus cause the motor power to be delivered to the consumer. Such operation of the clutch could be made manually, if the crank 161', which causes axial movement of the fork 93, is rocked forward (so that it rises above the plane of the drawing). It can also be operated automatically and such a case is illustrated in Fig. 16. The crank 161' has on its upper end a forked part 161", which engages a pin 163. This pin is fastened to the member 27, which is connected to the spider or roller carrier 22. As has been explained above, 22 and 27 make yielding angular movements under the influence of the reaction torque of the transmission A. The mechanism described will, therefore, cause an operation of the clutch 93—91'—92'—88 in response of such reaction torque. This action is countered by the spring and cam action 77—79, as shown in Fig. 2, and also by the action of the spring 79' of Fig. 16 (and 13), in combination with the pitch angle of the slot that moves the pin 162. As shown in Fig. 16, this pitch angle is not constant, so that the slot has a steep part and a comparatively flat part. The effect is, that up to a certain predetermined amount of reaction torque, the spider 22—27 is not able to overcome the spring action, and as soon as it exceeds that amount, the pin 162 passes to the flat portion of the slot, where a comparatively small torque can overcome the action of the spring, and shift the clutch member 91'. Movement of the pin 162 over the steep part of the slot 162' does not operate the clutch 91' due to the lost motion between 93' and the collar of 91'. In the same way, but in reverse direction, is the operation of the device when the reaction torque decreases. The torque has to be smaller than that which the spring 79' can hold in balance on the flat part of the slot, and once it passes below that value, the pin 162 moves all the way down the steep part of the slot where the spring 79' has the advantage over the torque, and shifts the clutch 91—91' to the left. This arrangement will cause the clutch to stay in one definite position for predetermined reaction torque values and will not shift back and forth at the slightest change of said torque, thus avoiding unstable conditions.

It appears also from Fig. 10, that instead of using the rod 160 to shift the clutch fork 93, this rod may be used in connection with the device 63—65 and made to operate the crank 66, thereby causing the reaction torque of transmission A to control the rate of ratio change thereof.

Since in most instances gears with limited gear ratios are used, it is important to know the aggregate losses, since they may either increase the required gear ratios or involve a greater inertia of the fly-wheel. To what extent the resultant losses influence the gear ratio will appear by reference to Figure 9 which, for the simplest case before referred to, involving a constant-speed drive and brief stops, shows the curves of the energy and speed in graphic form. The abscissae of Figure 15 represent time, and the ordinates represent speed or energy.

Figure 9:
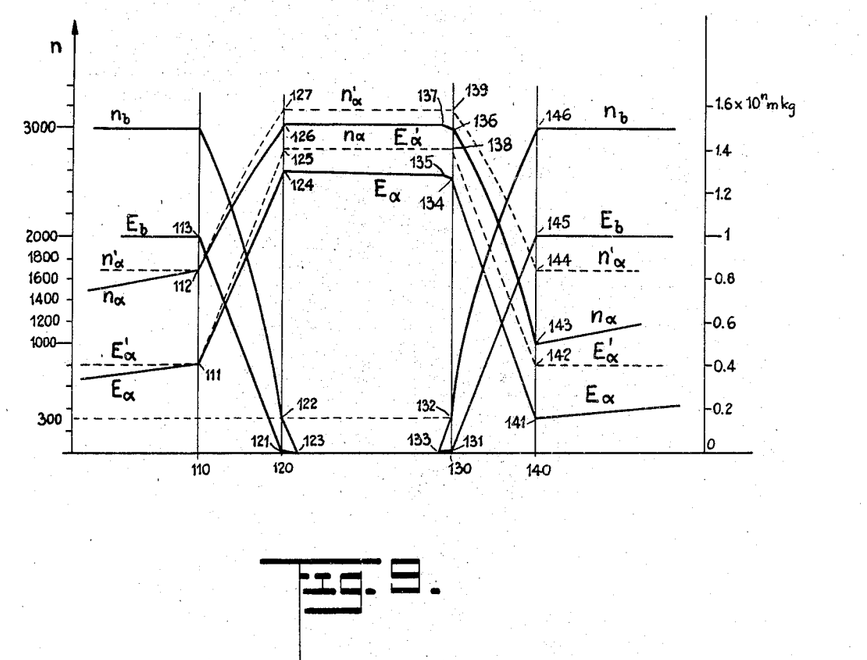
Figure 9 is a diagram illustrating graphs of speeds and energies with and without transmission losses.

The space between the ordinates at points 110 and 120 corresponds to the retarding or deceleration period of the masses C. At ordinate 110 deceleration of masses C begins which revolve at a speed Nb equal to 3000 R. P. M. and which contain an energy Eb equal to 1. The fly-wheel mass W will be supposed to have a speed N'α and energy E'α, if, for the time being, all actions shall be considered as taking place without losses in any of the parts. NIα stands for a speed of 1680 R. P. M. and the energy EIα is equal to 0.4Eb. In the case of lossless transmission, upon continued braking of the rotation of the masses C, the energy Eb would decrease from 113 to 120 and Nb from 114 to 120, whereas EIα would rise from point 0.4Eb to 1.4Eb; i. e., run from 111 to 125. Similarly NIα would rise from 1680 to 3140 R. P. M., in other words, from point 112 to 127. Now, if in lieu of a gear with an infinitely high gear ratio a gear with a restricted ratio were used, that is to say, one that would, for instance, reduce speeds Nb only to 300 R. P. M., with the balance being destroyed by a brake, this would mean a loss of one per cent of Eb, and this is scarcely representable in the drawings. The line Eb would lead from 113 to 121 instead of to 120, and similarly point 125 would be lowered only very little. But the difference for the speed curve Nb is considerable since this graph now terminates at 122 or runs thence in a different way, say, to 123 where the mass C would come to a standstill. The speed curve NIα undergoes such a little change that the difference is not representable in the drawings since it amounts to less than one-half of one per cent.

Assuming that the fly-wheel during the stops has no losses, then the energy EIα at the end of such period is unchanged, hence, it lies around 138; the same thing holds good for the speed NIα at 139. At ordinate 130 acceleration of masses C is resumed and deceleration of fly-wheel mass W begins. Energy EIα drops from 138 to 142 and thus has attained the value which it had on ordinate 110 at point 111. The cycle of forces is thus closed. Upon acceleration of C the speed graph N'α will then drop from 139 to 144 where N'α again attains the value of 1680 R. P. M. The aggregate gear ratio that is required is thus 3140:300 (or 10.5:1) times 3000: 1680 (or 1.79:1) which means an overall change of 18.8.

Examining conditions if frictional losses are present, and assuming an efficiency of ninety per cent, there follows for the energy transmission in gear A an energy graph Eα which lies below E'α previously considered. To be more precise, the energy contained in the fly-wheel after braking of masses amounts to only Eα= 1.3Eb instead of E'α=1.4Eb as before. The graph Eα runs from 111 to 124. During stopping periods, according to their length, losses between 1 and 2 percent will happen so that Eα at the end of the stop will reach only point 134. If also here a gear with the highest possible ratio (say 1:10) is used, and a clutch is used for starting in lieu of a gear with infinitely high gear ratio, there ensues a very small loss which corresponds to one-half the speed difference and which amounts to only one-half per cent. Since in a gear with infinitely high ratio of transmission the efficiency for large ratio is no longer high, it will be seen that for reasons of economy the use of such a gear is not required in the absence of any appreciable difference. The energy graph, on throwing in the clutch, experiences a slight bend at point 135. In reality the bend is less than that represented in the drawing.

As the acceleration of the masses C proceeds, the energy curve Eα reaches 141 where the energy of the fly-wheel W has dropped to 0.16Eb (contrasted with EIα=0.4 Eb). Starting at point 141, the driving motor must again furnish energy in such a way that at the end of the working period the energy content of the fly-wheel is again 0.4Eb. In other words, the motor must supplementally supply 0.24Eb, or, in other words, the energy accumulation operates at an efficiency of 76 per cent. The speed curve Nα starting at 132 (1680 R. P. M.) leads to 126 (ca 3040 R. P. M.), whence during the inoperative period it drops to 136 equalling approximately 3000

R. P. M. From there it falls further to 143 (ca 1060 R. P. M.). After this point has been reached the speed rises again during the working period. Whereas, previously, the fly-wheel had a minimum speed of 1680 R. P. M., it must now be exhausted to a point equal to 1060 R. P. M. in order to cover the losses caused by friction, etc. But this necessitates a larger gear ratio than had been required previously, where no losses were present. The gear ratio amounts now to 3040: 300 times 3000:1060 or 10.1×2.82=28.6. In other words, the range has been increased 52 per cent when working with the same masses or inertias. It is, of course, possible to reduce the speed relationship Nα (at 136 and 143) with the result that thereby the aggregate gear ratio would be reduced.

From the foregoing description considered in connection with the accompanying drawings, it is believed that the construction, operation and advantages of the different forms of the invention herein disclosed will be clearly understood. It is desired to point out, however, that while only certain specific embodiments of the invention have been disclosed, the same is capable of embodiment in various other mechanical structures within the spirit and scope thereof as defined in the appended claims.

I claim:

1. In combination with a power source and an energy consumer, a fly-wheel mass rotatable relative to the power source, a variable ratio transmission between the fly-wheel mass and the energy consumer, means to vary the ratio to cause a transfer of energy between the fly-wheel mass and the consumer, and a second variable transmission organized to transmit power from the power source to the fly-wheel, independent of the transfer of energy between said fly-wheel and said energy consumer.

2. In combination with a power source and an energy consumer, a fly-wheel mass rotatable independently of the power source, a variable ratio transmission between the fly-wheel mass and the energy consumer, means to vary the ratio to transmit energy between the fly-wheel mass and the consumer, and means operable for alternately connecting and disconnecting the power source with the consumer, to drive said consumer independently of the said fly-wheel.

3. In combination with a power source and an energy consumer, a fly-wheel mass rotatable relative to the power source, a variable ratio transmission between the fly-wheel mass and the energy consumer, means to vary the ratio to transmit energy from the fly-wheel mass to the consumer when acceleration of the consumer is desired and to transmit energy from the consumer to the fly-wheel mass when deceleration of the consumer is desired, a second variable ratio transmission connected with the power source, and means for selectively connecting said second variable transmission with the fly-whel mass or with the consumer.

4. In combination with a power source and an energy consumer, a fly-wheel mass rotatable relative to the power source, a variable ratio transmission between the fly-wheel mass and the energy consumer, means to vary the ratio to transmit energy from the fly-wheel mass to the consumer when acceleration of the consumer is desired and to transmit energy from the consumer to the fly-wheel mass when deceleration of the consumer is desired, a second variable ratio transmission connected with the power source, means for selectively connecting said second variable transmission with the fly-wheel mass or with the consumer, and means operable in response to the reaction torque of the first mentioned variable transmission to actuate said selective connecting means.

5. In combination with an energy consumer and a rotating inertia mass, means for transmitting energy from the consumer to the mass when it is desired to decelerate the consumer and for transmitting energy from the mass to the consumer when it is desired to accelerate the consumer, said means comprising a mechanical power transmission having a continuously variable speed ratio, means for continuously varying the ratio of said transmission, so as to effect a gradual acceleration or deceleration of said consumer, a control mechanism responsive to the power transmitted between said inertia mass and said consumer and means operatively connecting said mechanism to said ratio changing means to control the rate of ratio change effected thereby.

6. In combination with an energy consumer and a rotating inertia mass, a source of power for driving said consumer, means for connecting or disconnecting said power source from said consumer, means for transmitting energy from the consumer to the inertia mass when it is desired to decelerate the consumer, and for transmitting energy from the mass to the consumer when it is desired to accelerate the consumer, said means comprising a mechanical power transmission having a continuously variable speed ratio, means for continuously varying the ratio of said transmission, so as to effect a gradual acceleration or deceleration of said consumer, a control mechanism responsive to the power transmitted between said inertia mass and said consumer, and means operatively connecting said mechanism to said ratio changing means to control the rate of ratio change effected by said means.

7. In combination with an energy consumer and a rotating inertia mass, means for transmitting energy from the consumer to the inertia mass or vice versa for the purpose of decelerating or accelerating the consumer, said means comprising a mechanical power transmission having a continuously variable speed ratio, means for continuously varying the ratio of said transmission, so as to effect a continuous acceleration or deceleration of said consumer, a control mechanism responsive to accelerating and decelerating forces of said consumer, and means operatively connecting said mechanism to said ratio changing means whereby the rate of ratio change is controlled by said accelerating or decelerating forces.

8. In combination with an energy consumer and a rotating inertia mass, a mechanical variable speed transmission means connected to said energy consumer and said inertia mass, respectively, means for continuously varying the ratio of said transmission means, and a mechanism responsive to the torque transmitted between the consumer and the transmission so arranged as to control the speed of the ratio change of the said transmission.

9. In combination with an energy consumer and a rotating inertia mass, mechanical power transmission means having a continuously variable speed ratio, driving connections between said transmission, said energy consumer and said inertia mass respectively, a mechanism for varying the ratio of said transmission, a motor, another mechanical power transmission means having a continuously variable speed ratio and including means for varying the said ratio, said last named transmission being in driving connection with the said motor and the said inertia mass, and means responsive to the torque transmitted between said first named transmission and said consumer and adapted to counteract the action of said means for varying the ratio of said first named transmission, when the said torque exceeds a predetermined limit.

10. In combination with a power source and an energy consumer, a rotatable inertia mass, a mechanical power transmission having a continuously variable speed ratio, a mechanism for causing continuous changes in the said ratio, means adapting said transmission to transmit power between the inertia mass and the energy consumer, a second power transmission having a continuously variable speed ratio, said second transmission being operatively connected to the power source on one side and to the flywheel on the other side, and a mechanism responsive to the speed of the power source for effecting the ratio change of the last named transmission so as to keep the speed of the power source approximately constant.

11. In combination with an electrical motor and an energy consumer, a rotatable inertia mass, a continuously variable ratio power transmission, means for continuously changing the ratio thereof, said transmission being in driving connection with the inertia mass on one side and the consumer on the other, a second continuously variable ratio power transmission, means to change the ratio of said second transmission continuously, said second transmission being in driving connection with the motor on one side and the inertia mass on the other, and means responsive to the load upon the motor, said means being in operative connection to the above said means for changing the ratio of the said second power transmission, the above said load responsive means being so arranged and connected to the said ratio changing means of said second transmission that a decrease in the load of the motor will cause such a change in the speed ratio as to bring about an increase of the speed at which said inertia mass is driven.

12. In combination with an energy consumer and a flywheel, a variable ratio transmission in driving connection with said consumer and said flywheel respectively, means responsive to the torque transmitted between the flywheel and the consumer, a mechanism including operator operable resilient means tending when operated to continuously move parts of the said mechanism which are connected to the said transmission so as to bring about a continuous change in its ratio, and means connected to the said movable parts operable to limit the speed thereof, said last named means being operated by the above said torque responsive means.

13. In a combination as set forth in claim 12, said speed limiting means comprising a fluid displacement device and a variable by-pass valve for controlling the rate of fluid displacement, said valve being operated by the said torque responsive means.

14. In combination with a prime mover and an energy consumer, a fly-wheel mass rotatable relative to the prime mover, a variable ratio transmission connected to the fly-wheel mass and the energy consumer respectively, means to vary the ratio to cause a transfer of energy between the fly-wheel mass and the consumer, a second variable transmission drivably connected to said prime mover and said flywheel respectively independent of the first named variable transmission for transmitting power from the prime mover to the fly-wheel mass, and a mechanism responsive jointly to the energy flow into the prime mover and to the speed of the prime mover for automatically controlling the ratio of said second variable transmission.

15. In combination with a prime mover and an energy consumer, a rotatable inertia mass and a power transmission adapted to have its ratio varied continuously, means to vary said speed ratio continuously, said transmission being operatively connected to the inertia mass on one side and to the consumer on the other side, a second power transmission adapted to have its speed ratio varied continuously, means for varying said ratio continuously, driving connections between said transmission, said prime mover and said inertia mass respectively, a mechanism responsive to the flow of energy into said prime mover and means connecting said mechanism to said ratio varying means of said second transmission for varying the ratio thereof whereby the power delivered from the prime mover will be kept substantially constant.

16. In combination with a power source and an energy consumer, a rotatable inertia mass, a variable ratio transmission in driving connection with the inertia mass on one side and with the consumer on the other side, a mechanism for varying the ratio of said transmission, first means for rendering said mechanism effective, second means for limiting and controlling the rate of ratio change caused by said mechanism, and third means responsive to the power transmitted between the inertia mass and the energy consumer and operatively connected with said second means to modify the effectiveness of said second means.

17. In combination with a power source and an energy consumer, a rotatable inertia mass, a variable ratio transmission in driving connection with the inertia mass on one side and with the consumer on the other side, a mechanism for varying the ratio of said transmission, first means for rendering said mechanism effective, second means for limiting and controlling the rate of ratio change caused by said mechanism, and third means responsive to the power transmitted between the inertia mass and the energy consumer and operatively connected with said second means to modify the effectiveness of said second means, said second means comprising a fluid displacement device having an element movable in accordance with the energy transmitted between said inertia mass and said consumer to vary the resistance of said fluid displacement.

RICHARD ERBAN.